United States Patent [19]

Columbus et al.

[11] 4,444,933

[45] Apr. 24, 1984

[54] ADHESIVE CYANOACRYLATE COMPOSITIONS WITH REDUCED ADHESION TO SKIN

[75] Inventors: Peter S. Columbus, Whitestone; John Anderson, Douglaston, both of N.Y.

[73] Assignee: Borden, Inc., Columbus, Ohio

[21] Appl. No.: 446,254

[22] Filed: Dec. 2, 1982

[51] Int. Cl.³ .................... C08L 51/00; C08L 27/06; C08L 31/04; C08L 35/02
[52] U.S. Cl. .................................. 524/292; 525/295; 525/261; 524/293; 524/294; 524/295; 524/296; 524/297; 524/298; 524/299
[58] Field of Search .................. 525/295; 524/292

[56] References Cited

U.S. PATENT DOCUMENTS

| | | | |
|---|---|---|---|
| 2,784,127 | 3/1957 | Joyner et al. | 154/43 |
| 2,794,788 | 6/1957 | Coover, Jr. et al. | 260/17 |
| 2,804,073 | 8/1957 | Gallienne et al. | 128/156 |
| 3,223,083 | 12/1965 | Cobey | 128/92 |
| 3,507,822 | 4/1970 | Miyami | 260/31.8 |
| 3,564,078 | 2/1971 | Wicker | 260/881 |
| 3,654,239 | 4/1972 | McIntire et al. | 260/78.4 N |
| 3,667,472 | 6/1972 | Halpern | 128/334 R |
| 3,832,334 | 8/1974 | O'Sullivan et al. | 260/78.5 R |
| 4,038,345 | 7/1977 | O'Sullivan et al. | 260/881 |
| 4,102,945 | 7/1978 | Gleave | 260/879 |
| 4,196,271 | 4/1980 | Yamada et al. | 525/242 |

FOREIGN PATENT DOCUMENTS 1123360 8/1968 United Kingdom .

OTHER PUBLICATIONS

Coover, Jr.; H. W. and McIntire, J. M. "Cyanoacrylate Adhesives", B.Adhesive Materials, pp. 569–580.

Primary Examiner—Carman J. Seccuro
Attorney, Agent, or Firm—Millard & Cox

[57] ABSTRACT

A cyanoacrylate-based adhesive composition comprises 55–92% by weight of a 2-cyanoacrylate ester, preferably the ethyl ester, from 40–30% by weight of a vinyl chloride/vinyl acetate copolymer and not more than 25% by weight of a plasticizer (the plasticizer may be omitted entirely). The copolymer is preferably a vinyl chloride/vinyl acetate/maleic acid terpolymer. The adhesive compositions have greatly reduced adhesion to skin, not forming strong skin bonds for at least 30 seconds, in contrast to conventional cyanoacrylate adhesive compositions which form, within in about one second bonds strong enough to tear skin.

23 Claims, No Drawings

ADHESIVE CYANOACRYLATE COMPOSITIONS WITH REDUCED ADHESION TO SKIN

BACKGROUND OF THE INVENTION

This invention relates to adhesive compositions with reduced adhesion to skin. More particularly, it relates to adhesive compositions containing alkyl cyanoacrylates and having reduced adhesion to skin.

It has been known for many years that 2-cyanoacrylate esters make very powerful adhesives; see, for example, U.S. Pat. No. 2,794,788 issued June 4, 1957 to Coover and Shearer. Such cyanoacrylate ester adhesive compositions have become widely used because they form very powerful bonds between a wide variety of substrates; for example, cyanoacrylate ester adhesive compositions will rapidly form very strong bonds between glass, metals, plastics, wood, textiles and paper. A general review of conventional 2-cyanoacrylate ester adhesives may be found in I. Skeist (ed.), Handbook of Adhesives, 2nd Edn., Van Nostrand Reinhold Co. (1977), Chapter 34, pages 569-80. Unfortunately, such cyanoacrylate ester adhesive compositions suffer from the serious disadvantage that they also form very powerful bonds with human skin, and thus if the user of such an adhesive composition inadvertently gets even a very small amount of the adhesive composition on his finger tips or other exposed areas of skin while he is using the composition, the adhesive composition will rapidly bond the skin with which it comes into contact to another portion of the user's skin, the substrate being glued or to any other article with which the adhesive-covered skin comes into contact. Such accidental bonding of skin takes place very rapidly (within a few seconds) and the bonds thus formed are considerably stronger than human skin itself, so that if an attempt is made to tear the skin away from the object to which it has accidentally become adhered, serious damage to the skin and underlying tissue may result. Indeed, the bonds formed by cyanoacrylate esters with body tissues are to strong that such adhesive compositions have been recommended for medical and surgical use as an alternative to conventional surgical sutures for closing incisions and wounds and for repairing breaks or ruptures in bone and other tissues; see, for example, U.S. Pat. Nos. 3,223,083, issued Dec. 14, 1965 to Cobey, 3,667,472, issued June 6, 1972 to Halpern, and 3,940,362, issued Feb. 24, 1976 to Overhults. Moreover, if the cyanoacrylate adhesive composition is allowed to bond for more than a few minutes, it cures to such a degree that it is almost insoluble in all common solvents; thus by the time a person who has accidentally adhered his skin to itself or to some other material has had time to reach a first aid station or hospital emergency room, the adhesive composition has cured to a point at which the bond cannot be broken quickly or readily with any common solvents, and the breaking of such bonds is a complicated task even for skilled medical personnel. Hospital emergency room personnel frequently come into contact with such problems caused by the use of cyanoacrylate ester adhesive compositions. Methyl cyanoacrylate ester adhesive compositions produce skin bonds which are almost totally insoluble in all common solvents and are extremely difficult to break; the dangers thus associated with methyl cyanoacrylate compositions appear to have been at least a substantial factor in the withdrawal of most, if not all, methyl cyanoacrylate compositions formerly sold for household use.

The possibility of accidental skin adhesions does reduce the use of cyanoacrylate esters, since people requiring adhesive compositions may prefer to use an adhesive composition which, although forming a less powerful bond than a cyanoacrylate ester composition, does not carry the risk of accidental skin adhesions. In an industrial environment, the safety precautions necessary to prevent accidental skin adhesions may slow up the work of applying cyanoacrylate ester adhesive compositions to substrates, and thus reduce productivity. In domestic use, not only does the possibility of accidental skin adhesions make the use of cyanoacrylate ester adhesive compositions awkward in many instances, but it may reasonably be supposed that some domestic users will not buy such adhesive compositions at all, prefering the use of less powerful, and possibly more expensive, adhesive compositions rather than risk accidental skin adhesions. The risk of such accidental skin adhesions is exacerbated by the fact that most commercially-available cyanoacrylate ester adhesive compositions are, in their uncured state as applied to substrates, relatively mobile liquids which easily run from the substrate onto the fingers of a person holding the substrate.

Until now, it has been believed that the possibility of accidental skin adhesions is an inevitable concomitant to the use of cyanoacrylate ester adhesive compositions. It is believed that the curing of such compositions proceeds through an anionic mechanism, the composition being so easily polymerized that water alone is a sufficiently active compound to initiate such anionic polymerization. Indeed, it is believed that in normal use the curing of such compositions is initiated by atmospheric moisture and/or the minute amounts of water adsorbed onto most substrates. In view of the large proportion of water present in the human epidermis, it would appear inevitable that the polymerization of cyanoacrylate ester adhesive compositions would be greatly accelerated by contact with the human epidermis, and thus that all cyanoacrylate ester adhesive compositions would suffer from problems of skin adhesion.

Thus, although the problems of accidental skin adhesion associated with the use of cyanoacrylate ester adhesive compositions are well known and serious, and although these problems have reduced the desirability and volume of such adhesive compositions sold, no prior art cyanoacrylate ester adhesive composition is known which significantly reduces such problems, and hereto there have been good grounds for supposing that it was not possible to significantly reduce the skin adhesion of such compositions.

SUMMARY OF THE INVENTION

Surprisingly, we have now discovered that by adding controlled amounts of certain synthetic resins to cyanoacrylate ester adhesive compositions, the skin adhesion of such compositions is greatly reduced, thus rendering accidental skin adhesions much less likely and markedly facilitating the use of such adhesive compositions.

Accordingly, this invention provides an adhesive composition comprising from about 55 to about 92% by weight of a 2-cyanoacrylate ester; from about 4 to about 30% by weight of a vinyl chloride/vinyl acetate copolymer, this copolymer comprising a major proportion of vinyl chloride and a minor proportion, though not less than about 5% by weight, of vinyl acetate; and not more than about 25% by weight of a plasticizer.

This invention also provides a process for forming an adhesive composition, which comprises: forming a stabilized cyanoacrylate ester composition comprising a 2-cyanoacrylate ester and an anionic polymerization inhibitor; and dissolving a pulverulent vinyl chloride/vinyl acetate copolymer in the cyanoacrylate composition at a temperature of about 70° to about 85° C. until the copolymer is completely dissolved in the cyanoacrylate composition, such that the adhesive composition formed comprises from about 55 to about 92% by weight of the cyanoacrylate ester and about 4 to about 30% by weight of the copolymer.

Hereinafter, all parts and proportions are by weight unless otherwise stated.

DETAILED DESCRIPTION OF THE INVENTION

In the instant composition, the skin adhesion of a cyanoacrylate adhesive composition is reduced by adding to the composition a minor proportion of a vinyl chloride/vinyl acetate copolymer and, optionally, a plasticizer. As shown in more detail by the examples below, although a typical prior art cyanoacrylate ester adhesive composition forms a very strong skin bond (a bond which can damage skin if attempts are made to separate it) within about one second, preferred compositions of the invention can have their skin adhesion reduced to such an extent that only a relatively weak skin bond is formed after 60 minutes, such weak skin bonds being more easily broken by common solvents.

Any of the known cyanoacrylate ester adhesives may be used as the ester component of the instant composition. For example, methyl, ethyl, isopropyl and allyl 2-cyanoacrylates may be used. However, we prefer to use ethyl 2-cyanoacrylate since this compound shows the best storage stability. In the instant compositions, both methyl and isopropyl 2-cyanoacrylates exhibit poor storage stability; the methyl ester tends to cause phase separation in the composition, leading to thickening a few hours after mixing, while a composition containing the isopropyl ester gels overnight. In contrast, the instant compositions containing ethyl 2-cyanoacrylate are normally stable for approximately one year when stored in containers under ambient conditions at (75° F. (24° C.) and 50% relative humidity). Preferably, the cyanoacrylate ester comprises from about 75 to about 85% by weight of the composition. We prefer to use an ethyl 2-cyanoacrylate preparation having a viscosity of from 5 to 50 cPs. (The viscosity of a ethyl 2-cyanoacrylate preparation may be increased by polymerizing a small proportion of the ester, as described for example in British Pat. No. 1,123,360 or by adding to the monomeric ester a small proportion of a thickening agent such as polymethyl methacrylate, as described for example in U.S. Pat. No. 4,038,345 issued July 26, 1977 to O'Sullivan et al and U.S. Pat. No. 3,654,239 issued Apr. 4, 1972 to McIntire and Wicker.)

Examples of suitable ethyl 2-cyanoacrylate ester preparations are those available commercially under the trade names ACE EE, ACE E-50, CN-2 and CN-4 (all produced by Alteco U.S.A., Inc., 23510 Telo Avenue, Unit 9, Torrance, Calif. 90503), PTR-E3 and PTR E-40 (both produced by Pacer Technology & Resources, 1550 Dell Avenue, Suite K, Campbell, Calif. 95008) and SUPER 3-1000 (available from Three Bond of America, Torrance, Calif.). Mixtures of these commercially-available cyanoacrylate esters may also be used.

Very viscous cyanoacrylate ester preparations having viscosities in excess of 800 cPs. are available commercially; for example, Alteco U.S.A., Inc., produce a cyanoacrylate ester preparation CN-6 having a viscosity of 800–1200 cPs. Although we do not exclude the possibility of using such very viscous cyanoacrylate ester preparations in the instant adhesive compositions, we do not recommend the use of such viscous cyanoacrylate ester preparations for most uses of the instant adhesive compositions. The addition of a vinyl chloride/vinyl acetate copolymer, alone or in conjunction with a plasticizer, to such viscous cyanoacrylate ester preparations to form a composition of the invention will result in an instant adhesive composition having lower skin adhesion than the cyanoacrylate ester preparation alone, but result in a viscous composition which forms thick films when used in bonding and hence requires the use of an external catalyst, for example an amine, to effect further cure.

As those skilled in the art are aware, cyanoacrylate esters are susceptible to both anionic and free-radical polymerization, and it is therefore advisable to protect cyanoacrylate ester compositions against both types of polymerization to ensure that premature curing of the cyanoacrylate ester does not occur, thereby avoiding difficulties in storage. To avoid anionic polymerization, it is desirable to add the instant compositions an anionic polymerization inhibitor. Any of the anionic polymerization inhibitors used in prior art cyanoacrylate compositions can be used in the instant compositions; for example, the anionic polymerization inhibitor may be an acidic gas, a protonic acid, or an anhydride thereof. The preferred anionic polymerization inhibitor for use in the instant compositions is sulfur dioxide, preferably in an amount of from 0.001 to 0.5% of the composition. Other possible anionic polymerization inhibitors include nitrous oxide, hydrogen fluoride, hydrochloric acid, sulfuric acid, phosphoric acid, organic sulfonic and carboxylic acids and anhydrides thereof, phosphorus pentoxide and acid chlorides. The instant compositions also desirably contain from 0.01 to 0.05% of a free radical polymerization inhibitor. Again, any of the free radical polymerization inhibitors hitherto used in cyanoacrylate compositions may be used in the instant compositions; the free-radical polymerization inhibitors are usually phenolic-type compounds, for example hydroquinone, t-butylcatechol, pyrocatechol, and p-methoxyphenol. The commercially-available ethyl 2-cyanoacrylate preparations mentioned above are already stabilized; should it be necessary to adjust the concentration of stabilizer when using these commercially-available preparations, those skilled in the are will have no difficulty in adjusting the concentration of anionic and free radical polymerization inhibitors to appropriate values empirically.

We believe that it is the vinyl chloride/vinyl acetate copolymer in the instant compositions which is responsible for most of the reduction in skin adhesion. Some care must be exercised in selecting an appropriate vinyl chloride/vinyl acetate copolymer for use in the instant adhesive compositions since certain vinyl chloride/vinyl acetate copolymers are not compatible with the other components of the adhesive composition. Although it is not known exactly what factors are responsible for rendering certain commercially-available vinyl chloride/vinyl acetate copolymers incompatible with the remaining components of the instant adhesive composition, in practice incompatible copolymers are not a significant problem since those skilled in the art can very easily discover whether any particular copolymer is compatible by routine empirical tests. As already mentioned, the vinyl chloride/vinyl acetate copolymer comprises a major proportion of vinyl chloride and a minor proportion, but not less than about 5%, of vinyl acetate. In general, we have found that good results are obtained with copolymers which contain 80 to 90 percent of vinyl chloride and 10 to 20 percent by weight vinyl acetate.

Care should also be taken to ensure that the vinyl chloride/vinyl acetate copolymer selected does not increase the viscosity of the adhesive composition to an excessive extent since we have found that very viscous adhesive compositions do not cure rapidly and the quality of the final bond is adversely affected. Obviously, there is a continuous variation in rate of cure and quality of the final bond with the viscosity of the instant adhesive composition, and thus there is no one fixed upper limit for the viscosity of the instant adhesive composition; however, in general the properties of the instant adhesive compositions are adversely effected if their viscosity exceeds about 3,000 cPs.

Although the copolymer may be a simple vinyl chloride/vinyl acetate copolymer, we prefer to use a carboxyl-modified vinyl chloride/vinyl acetate copolymer, and in particular a vinyl chloride/vinyl acetate/maleic acid terpolymer, although other carboxylating agents, such as itaconic acid, may be employed if desired. The terpolymer desirably contains 80 to 90 percent of vinyl chloride, 10 to 20 percent of vinyl acetate and not more than 2% of maleic acid. More specifically, we have found that very good results are obtained using a terpolymer comprising about 83% vinyl chloride, about 16% vinyl acetate and about 1% maleic acid. A terpolymer having this composition is available commercially under the trade name UCAR VMCC (sold by Union Carbide Corporation, Coating Materials Division, Old Ridgebury Rd., Danbury, Conn. 06817). This material has an inherent viscosity of 0.38 when tested by the standard of American Society for Testing and Materials (ASTM) test D-1243, a specific gravity according to ATSM D-792 of 1.34, a glass transition temperature of 72° C., an average molecular weight of 15,000 and a solution viscosity at 25° C. of 100 cps. at 30% solids concentration in methyl ethyl ketone. Other resins that can be used in the instant compositions but are less desirable because of varying degrees of compatability in the instant compositions include those sold commercially as UCAR VMCH (a carboxyl-modified vinyl chloride/vinyl acetate copolymer) and UCAR VYHH, VYHD and VYLF, all three of these being simple vinyl chloride/vinyl acetate copolymers (all the aforementioned resins are available from Union Carbide at the address previously given). The use of the Union Carbide resin UCAR VMCA is not recommended since it is incompatible with the other components of the instant compositions. Further details of the physical properties of the preferred resins are given in the examples below. The preferred amount of copolymer for use in the instant compositions is from about 10 to about 18%.

It appears that the molecular weight of the copolymer may have an effect on its compatability with the other components of the instant adhesive composition. For example, the vinyl chloride/vinyl acetate/maleic acid terpolymer UCAR VMCA mentioned above, which is incompatible with the other components of the instant compositions has a molecular weight of 8,000, while the similar terpolymer VMCH, which has a molecular weight of 21,000 gives very acceptable results. It also appears that simple vinyl chloride/vinyl acetate copolymers need not have as high a molecular weight as the terpolymers to be useful in the instant compositions; for example although the aforementioned UCAR VMCA terpolymer having a molecular weight of 8,000 is not useful in the instant compositions, the simple copolymer UCAR VYLF, having substantially the same molecular weight, gives acceptable results.

It is believed (although the invention is in no way limited by this belief) that the mechanism by which the vinyl chloride/vinyl acetate copolymer reduces the skin adhesion of the instant compositions is primarily physical. Vinyl chloride/vinyl acetate copolymers themselves have an affinity and adhesion properties for metals, glass, rubber, plastics and other materials, and are capable of forming fairly strong bonds with these materials. It appears that the copolymer serves to provide a physical block which markedly reduces the amount of ethyl 2-cyanoacrylate which comes into contact with the skin, thus greatly reducing the skin adhesion of the composition. Although the preferred vinyl chloride/vinyl acetate/maleic acid terpolymer possesses some carboxyl cross-linking functionality, it does not react with the moisture present on the skin and bond the skin instantly as does unmodified ethyl 2-cyanoacrylate. However, although the vinyl chloride/vinyl acetate copolymer does not form strong bonds with the skin, its own adhesive properties are sufficiently good that it does not significantly affect the rate of cure of the instant adhesive compositions or the quality of the bond finally achieved when using such compositions. In fact, as shown in some of the examples below, at least when the preferred vinyl chloride/vinyl acetate/maleic acid terpolymer is employed, the bonds achieved using the instant adhesive composition are not only comparable in strength under normal conditions but are also more resistant to soaking in water and sodium hydroxide solution than bonds achieved with conventional unmodified ethyl 2-cyanoacrylate; these differences in bond characteristics are probably due to the carboxyl funtionality of the terpolymer.

It should be noted that the vinyl chloride/vinyl acetate copolymer used in the instant adhesive compositions can not be replaced by a mixture of polyvinyl chloride and polyvinyl acetate. As shown by the tests using pure polyvinyl chloride and polyvinyl acetate included after the examples below, polyvinyl chloride and polyvinyl acetate are insoluble in cyanoacrylate esters, or mixtures of cyanoacrylate esters with plasticizers.

Although it is not absolutely essential, it is preferred that the instant compositions contain a plasticizer. Desirably, the plasticizer comprises from about 3 to about 8% of the composition, and may be any of the liquid and solid plasticizers hitherto used in cyanoacrylate ester adhesive compositions. Examples of suitable liquid plasticizers include dipropylene glycol dibenzoate (available as Benzoflex, Registered Trademark 9-88 from Velsicol Chemical Corporation, 341 East Ohio Street, Chicago, Ill. 60611), diethylene glycol dibenzoate (available commercially as Benzoflex 2-45 from Velsicol Chemical Corporation), butyl benzyl phthalate (available commercially as Santicizer 160 from Monsanto), the polymeric plasticizer available as Resoflex R-296 from Cambridge Industries Company, Inc., 440 Arsenal Street, Watertown, Mass. 02172 and dibutyl phthalate. Dimethyl and diethyl phthalate can also be used but are less desirable because of their higher volatility. Examples of suitable solid plasticizers include benzoate esters of di- and polyhydroxy branched aliphatic compounds such as those available commercially as Benzoflex S-312, S-404 and S-552 (all obtainable from Velsicol Chemicals Corporation of the address previously given). Mixtures of plasticizers may of course be used.

The plasticizer serves to render the cured film of the adhesive produced by the instant adhesive compositions more flexible; the plasticizer in effect softens the polymerized cyanoacrylate/copolymer mixture in the cured film. Thus, the addition of plasticizer improves the adhesion of the composition to flexible substrates and also improves the impact resistance of the composition when it is used to bond rigid substrates. The plasticizer also assists the vinyl chloride/vinyl acetate copolymer in reducing the skin adhesion of the composition. Experiments we have conducted show that the plasticizer normally serves to further reduce the skin adhesion of the composition, as compared with a composition comprising solely the cyanoacrylate ester and the vinyl chloride/vinyl acetate copolymer, but that the addition of the plasticizer does not significantly affect the rate of cure of the composition nor does it significantly affect the quality of the bonds produced within the adhesive composition cures.

The incorporation of the plasticizer into the instant adhesive composition also serves to lower the viscosity of the cyanoacrylate/copolymer mixture. If the cyanoacrylate/copolymer mixture tends to be too viscous, it is desirable to use a liquid plasticizer, since such a liquid plasticizer usually lowers the viscosity 5-20% depending upon the amount of plasticizer used. Solid plasticizers have less effect on the viscosity, typically lowering the viscosity only about 2-10%, depending upon the amount of solid plasticizer employed. Finally, the commercially-available plasticizers are much lower in cost than stabilized cyanoacrylate esters, so that the addition of plasticizer to the cyanoacrylate/copolymer mixture "extends" the relatively expensive cyanoacrylate ester thus producing the cost of the final composition.

It will thus be seen that the use of a plasticizer in the instant adhesive composition gives a number of significant advantages. Accordingly, although the instant adhesive compositions need not contain any plasticizer at all, in general it is recommended that the instant compositions do include a plasticizer.

In addition to reduced skin adhesion, the instant compositions possess additional advantages. Presumably because of their reduced skin adhesion, the instant compositions tend to be easier to clean up and to remove from the skin; they are conveniently removed from the skin with acetone, or with nail polish remover. The instant compositions are also lower in cost per unit weight than prior art compositions which comprise substantially pure ethyl 2-cyanoacrylate monomer, since in the instant compositions the expensive cyanoacrylate ester is "extended" with relatively less expensive copolymers and plasticizers. For example, stabilized ethyl 2-cyanoacrylate monomer costs approximately 12-15 dollars per pound, whereas the aforementioned UCAR VMCC vinyl chloride/vinyl acetate/maleic acid terpolymer costs approximately $1.24 per pound and the aforementioned Benzoflex 9-88, S-312 and S-404 plasticizers range in price from 58 cents to $1.65 per pound. Thus, by using a composition comprising approximately 75% ethyl 2-cyanoacrylate, 17% of copolymer and 8% of plasticizer, the cost per unit weight of the composition can be reduced by more than 20% as compared with a pure ethyl 2-cyanoacrylate composition. Finally, as shown in more detail in the examples below, at least some of the instant compositions have a resistance to hot and cold water and to sodium hydroxide solution which is better than that of prior art pure cyanoacrylate ester compositions.

The advantages of reduced skin adhesion, easier clean-up and lower cost associated with the instant adhesive compositions do not involve any sacrifice in bond strength or rate of curing as the comparative tests below show, the strength of the bonds produced by the instant compositions are as good as, and in some cases better than, prior art cyanoacrylate adhesive compositions, and the instant compositions also cure as fast as the prior art compositions. Moreover, since the presence of the vinyl acetate/vinyl chloride copolymer (and, optionally, of the plasticizer) renders the cured films formed from the composition more flexible than those formed from prior art compositions, and this film flexibility increases the adhesion of the instant compositions to flexible substrates, and also increases their impact resistance on rigid substrates. Finally, although the cured form of the instant compositions is more soluble in acetone and nail polish remover than prior art compositions, the tests described below show that the cured form of the instant compositions is not more affected by most other solvents than are the cured forms of prior art compositions; indeed, when cured the instant compositions appear to display resistance to the effects of alkali and boiling water which is noticeably greater than that of prior art compositions.

The instant compositions may be prepared by forming a stabilized cyanoacrylate ester composition comprising a 2-cyanoacrylate ester and an anionic polymerization inhibitor and dissolving the vinyl chloride/vinyl acetate copolymer in a pulverulent state in the cyanoacrylate composition with a temperature of about 70°–85° C. until the copolymer is completely dissolved. If a plasticizer is to be added, we prefer to dissolve it in the cyanoacrylate composition at the same temperature of about 70° to about 85° C. after the copolymer has been dissolved in the composition. Especially where the anionic polymerization inhibitor used in the cyanoacrylate ester composition is sulfur dioxide, the cyanoacrylate ester is conveniently prepared with the inhibitor already contained therein. The various stages in the synthesis of the 2-cyanoacrylate ester may be conducted with a stream of sulfur dioxide passing through the system, thus building up a high temperature of inhibitor as the 2-cyanoacrylate ester is produced in the last stage of the synthesis. In fact, the concentration of inhibitor which builds up is greater than is desirable in the instant compositions, and it is therefore desirable to remove excess inhibitor by applying a vacuum to the ester after it has been synthesized. This process of stabilizing the adhesive during synthesis is described in U.S. Pat. No. 2,756,251.

Specific preferred compositions and processes of the invention will now be described, though by way of illustration only, to show details of particularly preferred reagents and techniques used in the compositions and processes of the invention.

In the following examples, various commercially-available products are referred to by their trade names. The products thus identified are as follows:

CYANOACRYLATE ESTERS

The cyanoacrylate esters CN-2, CN-4, CN-6, EE and E-50, used in the examples are all obtainable from Alteco U.S.A., Inc. 23510 Telo Avenue, Unit 9, Torrance, Calif. 90503. The main constituent of all these preparations is ethyl 2-cyanoacrylate. According to the manufacturer's data, all these cyanoacrylate ester preparations are colorless transparent liquids having a storage life at 25° C. in excess of one year and being soluble in acetone and nitromethane. The CN-2, CN-4 and CN-6 preparations all have a specific gravity of 1.05–1.10 at 25° C./4° C. and a refractive index ($n_D^{20}$) of 1.45; the bonds they produce have excellent impact resistance and high tensile strength. The preparation CN-2 has a viscosity of 3–5 cPs., the preparation CN-4 a viscosity of 75–100 cPs and the preparation CN-6 a viscosity of 1000–1200 cPs. The preparations EE and E-50 both have specific gravities of 1.05–1.08 at 25° C./4° C., and a refractive index ($n_D^{20}$) of 1.48. The preparation EE has a viscosity of 3–5 cPs., while the preparation E-50 has a viscosity of 75–100 cPs.

RS40X and RPNX are ethyl 2-cyanoacrylate esters available from Sumitomo Chemical Company Ltd., Osaka, Japan. According to the manufacturer's data, RS40X is a transparent, colorless liquid having a flash point of 80° C. and a specific gravity of 1.07, while RPNX is also a transparent colorless liquid having a flash point of 85° C. and a specific gravity of 1.05. The manufacturer states that both these cyanoacrylate esters are soluble in acetone, methyl ethyl ketone, benzene, toluene and nitromethane. RS40X and RPNX are similar in properties to CN-4 and CN-2 respectively.

COPOLYMERS

All the copolymers used are available from Union Carbide Corporation at the address previously given and are sold by them as UCAR resins VMCC, VMCH, VMCA and VYLF. As previously mentioned, VMCC comprises, according to the manufacturer's data, 83% vinyl chloride, 16% vinyl acetate and 1% maleic acid. This resin has an inherent viscosity according to ASTM D-1243 of 0.38, a specific gravity according to ASTM D-792 of 1.34, a glass transition temperature of 72° C. and an average molecular weight $\overline{M}_n$ 15,000. The solution viscosity at 30% solids in methyl ethyl ketone at 25° C. is 100 cPs. The resin VMCH comprises 86% vinyl chloride, 13% vinyl acetate and 1% maleic acid. This resin has in inherent viscosity of 0.50, a specific gravity of 1.35, a glass transition temperature of 74° C., an average molecular weight of 21,000 and a solution viscosity of 650 cPs, using the same tests as previously mentioned. The resin VMCA comprises 81% vinyl chloride, 17% vinyl acetate and 2% maleic acid; this resin has an inherent viscosity of 0.32, a specific gravity of 1.34, a glass transition temperature of 70° C., an average molecular weight of 8,000 and a solution viscosity of 55 cPs. Finally, the resin VYLF, which is a simple vinyl chloride/vinyl acetate copolymer without modifying groups, comprises 88% vinyl chloride and 12% viynl acetate. This resin has an inherent viscosity of 0.28, a specific gravity of 1.36, a glass transition temperature of 68° C., an average molecular weight of 8,000 and a solution viscosity of 60 cPs.

PLASTICIZERS

The plasticizers used include Benzoflex 9-88, 50, 2-45, S-312, S-552 and S-404, all available from Velsicol Chemical Corporation at the address previously given. Benzoflex 9-88 comprises dipropylene glycol dibenzoate, Benzoflex 2-45 comprises diethylene glycol dibenzoate, Benzoflex S-312 comprises neopentyl glycol dibenzoate, Benzoflex S-552 comprises pentaerythritol tetrabenzoate, and benzoflex S-404 glyceryl tribenzoate, all these compositions being at least 97% pure by ester content assay. Benzoflex 50 comprises a 1:1 mixture of Benzoflex 9-88 and Benzoflex 2-45. The other plasticizers that were used were Santicizer 160, available from Monsanto and comprising a butyl benzyl phthalate, Resoflex R-296 available from Cambridge Industries Company, Inc., and comprising an unmodified long chain saturated polyester, and dibutyl phthalate.

STABILIZER

In many of the adhesive compositions described below, hydroquinone as a free-radical stabilizer. It is believed that most commercially-available stabilized cyanoacrylate esters already contain some hydroquinone. However, in many cases we have found it advantageous to add further amounts of hydroquinone to the instant adhesive compositions to provide increased stability. In all cases, the hydroquinone is added to the composition with the vinyl chloride/vinyl acetate copolymer and dissolves therewith.

EXAMPLE I

An adhesive composition of the invention was formulated using the following components and proportions:

| Reagent | % |
| --- | --- |
| Alteco CN-2 | 80.913 |
| VMCC | 14.279 |
| Hydroquinone | 0.048 |
| Benzoflex 9-88 | 4.760 |
| | 100.000 |

The stabilized cyanoacrylate composition, CN-2 was heated to 70°–85° C. and the copolymer, VMCC, which was obtained in powdered form, was dissolved in the heated cyanoacrylate composition by mixing over a period of approximately 20 minutes within this temperature range. The 20 minute mixing period usually sufficed to complete dissolve the copolymer, but if the copolymer had not completely dissolved at the end of the mixing, mixing was continued until the resin was completely dissolved. The cyanoacrylate/copolymer mix was then maintained within the same temperature range while the plasticizer, Benzoflex 9-88, was added thereto, and the mixing was continued at the same temperature for an additional 5–10 minutes until the plasticizer had become completely uniformly mixed into the composition. Finally, the instant adhesive composition was cooled and passed through a fine polytetrafluoroethylene filter.

Details of the properties of this composition, and those produced in the following Examples II–XXIII are given in the section headed "Test Results" below.

EXAMPLE II

An instant adhesive composition was formulated from the following components in the same manner as in Example I above:

| Reagent | % |
| --- | --- |
| CN-2 | 76.153 |
| VMCC | 19.039 |
| Hydroquinone | 0.048 |
| Benzoflex 9-88 | 4.760 |
| | 100.000 |

EXAMPLE III

Another instant adhesive composition was formulated from the following components in the same manner as in Example I above:

| Reagent | % |
| --- | --- |
| CN-2 | 71.394 |
| VMCC | 23.798 |
| Hydroquinone | 0.048 |
| Benzoflex 9-88 | 4.760 |
| | 100.000 |

EXAMPLE IV

Another instant adhesive composition was formulated from the following components in the same manner as in Example I:

| Reagent | % |
| --- | --- |
| CN-2 | 66.634 |
| VMCC | 28.558 |
| Hydroquinone | 0.048 |
| Benzoflex 9-88 | 4.760 |
| | 100.000 |

EXAMPLE V

Another instant adhesive composition was formulated from the following components in the same manner as in Example I:

| Reagent | % |
| --- | --- |
| CN-2 | 60.843 |
| VMCC | 26.076 |
| Hydroquinone | 0.043 |
| Benzoflex 9-88 | 13.038 |
| | 100.000 |

EXAMPLE VI

Another instant adhesive composition was formulated from the following components in the same manner as in Example I above, except that the two cyanoacrylate compositions, CN-2 and CN-4 were first mixed with each other at room temperature for five minutes before admixture of the other components as described in Example I:

| Reagent | % |
| --- | --- |
| CN-2 | 39.266 |
| CN-4 | 42.837 |
| VMCC | 13.089 |
| Hydroquinone | 0.048 |
| Benzoflex 9-88 | 4.760 |
| | 100.000 |

EXAMPLE VII (CONTROL)

To simulate a typical prior art stabilized cyanoacrylate composition, 48 parts of CN-2 were mixed with 52 parts of CN-4 at room temperature to form a control composition.

EXAMPLE VIII (CONTROL)

This control composition comprised pure CN-2.

EXAMPLE IX (CONTROL)

This control composition comprised pure CN-4.

EXAMPLE X

To provide an instant adhesive composition containing isopropyl 2-cyanoacrylate, the following components were formulated in the same way as in Example I above:

| Reagent | % |
| --- | --- |
| Alteco isopropyl 2-cyanoacrylate | 82.103 |
| VMCC | 13.089 |
| Hydroquinone | 0.048 |
| Benzoflex 9-88 | 4.760 |
| | 100.000 |

This composition was considerably less stable than the instant compositions containing ethyl 2-cyanoacrylate described above. As prepared, the composition was cloudy and it gelled upon overnight standing. Thus, this composition is not suitable for retail sale, where a long shelf-life is essential but might be suitable for industrial use where it could be applied shortly after formulation.

EXAMPLE XI

To provide an instant adhesive composition containing methyl 2-cyanoacrylate the following components were formulated in the same way as in Example I above:

| Reagent | % |
| --- | --- |
| Alteco methyl 2-cyanoacrylate | 82.103 |
| VMCC | 13.089 |
| Hydroquinone | 0.048 |
| Benoflex 9-88 | 4.760 |
| | 100.000 |

This composition was considerably less stable than the instant compositions containing ethyl 2-cyanoacrylate described above. The product underwent phase separation and thickened a few hours after mixing. Thus, as with the composition of Example X above, the use of this composition is restricted to applications where the composition can be used within a few hours after its manufacture.

The following Examples XII–XIV are similar to Example VI except that various different plasticizers were substituted for the Benzoflex 9-88 used in Example VI. Examples XII–XVI were formulated in a manner identical to that used in Example VI.

EXAMPLE XII

| Reagent | % |
| --- | --- |
| CN-4 | 42.836 |
| CN-2 | 39.267 |

-continued

| Reagent | % |
|---|---|
| VMCC | 13.089 |
| Hydroquinone | 0.048 |
| Benzoflex 50 | 4.760 |
| | 100.000 |

EXAMPLE XIII

| Reagent | % |
|---|---|
| CN-4 | 42.836 |
| CN-2 | 39.267 |
| VMCC | 13.089 |
| Hydroquinone | 0.048 |
| Benzoflex 2-45 | 4.760 |
| | 100.000 |

EXAMPLE XIV

| Reagent | % |
|---|---|
| CN-4 | 42.836 |
| CN-2 | 39.267 |
| VMCC | 13.089 |
| Hydroquinone | 0.048 |
| Santicizer 160 | 4.760 |
| | 100.000 |

EXAMPLE XV

| Reagent | % |
|---|---|
| CN-4 | 42.836 |
| CN-2 | 39.267 |
| VMCC | 13.089 |
| Hydroquinone | 0.048 |
| Benzoflex S-312 | 4.760 |
| | 100.000 |

EXAMPLE XVI

| Reagent | % |
|---|---|
| CN-4 | 42.836 |
| CN-2 | 39.267 |
| VMCC | 13.089 |
| Hydroquinone | 0.048 |
| Rezoflex R-296 | 4.760 |
| | 100.000 |

EXAMPLE XVII

The following composition is identical to Example VI above and was formulated in precisely the same manner, except that Alteco EE was substituted for Alteco CN-4 and Alteco E-50 was substituted for Alteco CN-2:

| Reagent | % |
|---|---|
| EE | 42.836 |
| E-50 | 39.267 |
| VMCC | 13.089 |
| Hydroqunoine | 0.048 |
| Benzoflex 9-88 | 4.760 |

-continued

| Reagent | % |
|---|---|
| | 100.000 |

EXAMPLE XVIII

Another instant adhesive composition was formulated in the same manner in Example I, but using the following components:

| Reagent | % |
|---|---|
| CN-2 | 84.957 |
| VMCH | 9.995 |
| Hydroquinone | 0.050 |
| Benzoflex 9-88 | 4.998 |
| | 100.000 |

XIX

This example illustrates the effect of omitting the plasticizer from the adhesive composition of Example VI. An instant adhesive composition was formulated in the same manner as in Example VI but using the following components:

| Reagent | % |
|---|---|
| CN-4 | 44.978 |
| CN-2 | 41.229 |
| VMCC | 13.743 |
| Hydroquinone | 0.050 |
| | 100.000 |

EXAMPLE XX

Another instant adhesive composition was formulated in the same manner in Example VI above but using the following components:

| Reagent | % |
|---|---|
| CN-4 | 43.881 |
| CN-2 | 40.224 |
| VMCC | 13.408 |
| Hydroquinone | 0.049 |
| Benzoflex 9-88 | 2.438 |
| | 100.000 |

The following examples XXI and XXII are similar to Example XV above, except that in place of the mixture of Alteco CN-2 and CN-4 used in Example XV, Example XXI uses pure CN-2 while Example XXII uses pure CN-4. Both compositions were formulated in the same manner as in Example I above.

EXAMPLE XXI

| Reagent | % |
|---|---|
| CN-2 | 82.103 |
| VMCC | 13.089 |
| Hydroquinone | 0.048 |
| Benzoflex S-312 | 4.760 |
| | 100.000 |

EXAMPLE XXII

| Reagent | % |
| --- | --- |
| CN-4 | 82.103 |
| VMCC | 13.089 |
| Hydroquinone | 0.048 |
| Benzoflex S-312 | 4.760 |
| | 100.000 |

EXAMPLE XXIII (CONTROL)

Pacer E-40 a commercially-available stabilized cyanoacrylate composition sold by Pacer Technology and Resources, 1550 Dell Avenue, Suite K, Campbell, Calif. 95008, was used as a control composition.

Examples XXIV and XXV below illustrate instant adhesive compositions without plasticizers. Both these compositions were prepared in the same manner as in Example I above, except of course that the addition of plasticizer was not made.

EXAMPLE XXIV

| Reagent | % |
| --- | --- |
| CN-2 | 85 |
| VMCA | 15 |
| | 100 |

EXAMPLE XXV

| | |
| --- | --- |
| Alteco E-50 | 85 |
| VMCA | 15 |
| | 100 |

The stability of the compositions of both Examples XXIV and XXV was very poor; both compositions gelled while mixing, the composition foaming up and solidifying.

Examples XXVI and XXVII below illustrate instant adhesive compositions containing the simple vinyl chloride/vinyl acetate copolymer UCAR VYLF in place of the vinyl chloride/vinyl acetate/maleic acid terpolymers used in the preceding examples. The compositions of Examples XXVI and XXVII were prepared by the same method as in Example I above.

EXAMPLE XXVI

| Reagent | % |
| --- | --- |
| E-50 | 80.952 |
| VYLF | 14.286 |
| Benzoflex 9-88 | 4.762 |
| | 100.000 |

It will be seen that, unlike most of the preceding examples, this composition did not contain the free radical polymerization inhibitor hydroquinone. The absence of a free radical polymerization inhibitor greatly reduced the stability of the composition, which gelled overnight, although it was stable for a period of a few hours after preparation.

EXAMPLE XXVII

| Reagent | % |
| --- | --- |
| CN-2 | 80.913 |
| VYLF | 14.279 |
| Hydroquinone | 0.048 |
| Benzoflex 9-88 | 4.760 |
| | 100.000 |

The presence of hydroquinone in this composition rendered it considerably more stable than the composition of Example XXVI, which is similar except for the absence of hydroquinone. This composition remained stable for several days but increased markedly in viscosity and underwent phase separation after one week.

Examples XXVIII and XXIX are identical to Example VI above and were prepared in precisely the same manner, except that the plasticizer Benzoflex 9-88 used in the composition of Example VI was replaced by Benzoflex S-522 in Example XXVIII and Benzoflex S-404 in Example XXIX; also the plasticizer was admixed with the other components at 80° C.

EXAMPLE XXVIII

| Reagent | % |
| --- | --- |
| CN-2 | 42.836 |
| CN-4 | 39.267 |
| VMCC | 13.089 |
| Hydroquinone | 0.048 |
| Benzoflex S-552 | 4.760 |
| | 100.000 |

EXAMPLE XXIX

| Reagent | % |
| --- | --- |
| CN-2 | 42.836 |
| CN-4 | 39.267 |
| VMCC | 13.089 |
| Hydroquinone | 0.048 |
| Benzoflex S-404 | 4.760 |
| | 100.000 |

EXAMPLE XXX

This example illustrates a composition similar to that of Example XXIX, except at the proportion of plasticizer is increased. An instant adhesive composition was formulated from the following components by the same method described in Example VI above, except that the powdered plasticizer, Benzoflex S-404 was added at 80° C. This example, and the following Example XXXI represent the presently preferred compositions of the invention:

| Reagent | % |
| --- | --- |
| CN-4 | 39.00 |
| CN-2 | 38.45 |
| VMCC | 15.00 |
| Hydroquinone | 0.05 |
| Benzoflex S-404 | 7.50 |
| | 100.00 |

EXAMPLE XXXI

This example illustrates an instant adhesive composition similar to that of Example XXX except for the use of different cyanoacrylate compositions; the Alteco CN-4 and CN-2 of Example XXX were replaced with RS-40X and RPNX respectively. The method of preparation was the same as in Example XXX:

| Reagent | % |
|---|---|
| RS-40X | 39.00 |
| RPNX | 38.45 |
| VMCC | 15.00 |
| Hydroquinone | 0.05 |
| Benzoflex S-404 | 7.50 |
| | 100.00 |

EXAMPLE XXXII

Another instant adhesive composition was formulated from the following components using the same method as in Example XXX:

| Reagent | % |
|---|---|
| CN-4 | 45.00 |
| CN-2 | 41.20 |
| VMCC | 13.75 |
| Hydroquinone | 0.05 |
| Benzoflex 9-88 | 2.50 |
| Benzoflex S-552 | 2.50 |
| | 100.00 |

EXAMPLE XXIII (CONTROL)

Pure Alteco CN-6 was used as a control composition.

EXAMPLE XXXIV

Another instant adhesive composition was prepared from the following components using the same technique as in Example I (although sulfur dioxide is shown separately in the following list of components, the sulfur dioxide was in fact present in the cyanoacrylate monomer as procured and was not added separately during the preparation):

| Reagent | % |
|---|---|
| Ethyl 2-cyanoacrylate monomer | 77.488 |
| Sulfur dioxide | 0.0020 |
| Hydroquinone | 0.0100 |
| Carboxyl-modified vinyl chloride/vinyl acetate copolymer | 15.0000 |
| Plasticizer | 7.5000 |
| | 100.0000 |

EXAMPLE XXXV

The following composition is a presently preferred composition of the invention using a liquid plasticizer:

| Reagent | % |
|---|---|
| CN-4 | 39 |
| CN-2 | 38.45 |
| VMCC | 15.00 |
| Hydroquinone | 0.05 |
| Dibutyl phthalate | 7.50 |

| Reagent | % |
|---|---|
| | 100.00 |

TEST RESULTS

Except where the compositions were unstable as previously noted, each of the compositions in Examples I-XXXIII and XXXV above were subjected to the following tests:

Viscosity

The viscosity of the adhesive compositions was measured using a Brookfield Synchro-lectric viscometer, Model LVF. The tests were conducted using a #3 spindle at 60 revolutions per minute and 25° C.

Rate of Cure

One drop of the adhesive composition was placed between two flat pieces of the substrate, and then the upper plate was twirled under slight pressure until gelling occurred. The gelling time was measured in seconds. In all cases, two similar portions of the substrate were used, the substrates used being stainless steel, rubber, glass and polyvinyl chloride film (PVC), All rate of cure tests were carried out at 75° F. (24° C.) and 50% relative humidity.

Bond Development: Tensile Strength

The adhesive composition was placed between two stainless steel plates and allowed to gel for five minutes, one hour, 24 hours or five days. The plates were then pulled apart using a Comten 922 MT-20-OP pulling machine using a pull rate of six inches/minute (15 cm./min.). The tensile force necessary to break the bond is given in pounds per square inch, and all values given are averaged over 10 specimens. All tests were conducted at 75° F. (24° C.) and 50% relative humidity.

The results of all the foregoing tests are shown in Table 1 below. The results of the following tests are shown in Table 2 below.

Skin Adhesion

One drop of adhesive was applied between the tips of the thumb and forefinger of a volunteer and the adhesion obtained was checked 1, 5, 10, 15, 20, 30, 45, and 60 seconds after application. The time and the degree of skin bonding obtained were recorded, the types of skin bonding mentioned in Table 2 being as follows:
1. Weak skin bond (W)—a bond which was easily broken by finger strength with no damage to the skin.
2. Strong bond (S)—a bond which was not easily broken directly by finger strength but which could be separated by peeling; and
3. Very strong skin bond (VS)—a bond which was sufficiently strong that skin damage would occur if the skin was separated.

In addition to measuring the strength of the skin bond, the resistance of that bond to attack by acetone and Cutex (registered trademark) nail polish remover was measured. (Cutex nail polish remover is manufactured by Cheseborough Ponds, Inc. of Greenwich, Conn. and its ingredients are stated by the manufacturer to be acetone, water, PEG-115 tallow polyamine, fragrance and D&C yellow #11.) In Table 2 below, "easy" (E) indicates that the finger-to-thumb bond could be broken for soaking for less than 90 seconds in either acetone or nail polish remover, while "difficult" (D) indicates that the bond could only be broken by soaking in acetone for more than three minutes or in nail polish remover for more than five minutes.

one attempted to separate them by force, and these very strong skin bonds were difficult to break with either acetone or nail polish remover. In contrast, all of the instant compositions took at least thirty seconds to form a skin bond which, although strong, was peelable and would not damage skin, and these skin bonds were relatively easily removed with either acetone or nail polish remover. Moreover, comparison of the skin adhesion times in Table 2 with the corresponding rate of cure times in Table 1 shows that, at least on rubber, glass and polyvinyl chloride substrates, the skin adhesion time of the instant compositions is considerably greater than their gelling times. Thus, if a user of the adhesive composition is holding two parts of an object together until the adhesive composition gels and thus produces a bond between the two parts, even if the person has accidentally applied some of the adhesive to his finger tips, the two parts of the object will be held together before the fingers become strongly adhered to the object, and thus there is little possibility of skin adhesions. On the other hand, with the prior art compositions the gel time is considerably longer than the skin adhesion time, so that accidental skin adhesions are very likely when a person is holding two parts of an object together until the adhesive composition gels.

It should also be noted that, with the exception of the composition of Example XXXIII, which is not a typical prior art cyanoacrylate adhesive composition, the prior art compositions have much lower viscosities than the instant compositions and are thus far more likely to run from the desired location. This greater fluidity of the prior art compositions increases the risk of accidental skin adhesions during use.

Finally, comparison of the composition of Example V with those of Examples III and IV shows that when the proportion of cyanoacrylate in the instant adhesive compositions falls to about 60%, the final bond strength of the bond formed tends to appreciably reduced. Accordingly, we prefer to keep the proportion of cyanoacrylate in the instant compositions above 60% and in-

TABLE 1

| Example # | Viscosity cPs | Rate of Cure (Secs. to gel) | | | | Bond Development (lbs/in$^2$) | | | |
|---|---|---|---|---|---|---|---|---|---|
| | | Steel | Rubber | Glass | PVC | 5 min. | 1 hr. | 24 hrs. | 5 days |
| I | 300 | 75 | 5 | 6 | 15 | 1842 | 3350 | 4780 | 5038 |
| II | 450 | 75 | 6 | 6 | 15 | 2079 | 3350 | 4870 | 5375 |
| III | 2000 | 75 | 6 | 7 | 15 | 2070 | 2890 | 4523 | 5950 |
| IV | 4500 | 75 | 6 | 7 | 17 | 973 | 1670 | 4510 | 5488 |
| V | 3900 | 75 | 8 | 12 | 15 | 1150 | 2960 | 3863 | 4150 |
| VI | 365 | 60 | 6 | 10 | 10 | 2883 | 3110 | 4825 | 5875 |
| VII (Control) | 30 | 45 | 6 | 2 | 9 | 2940 | 3290 | 5100 | 5238 |
| VIII (Control) | 5 | 4 | 3 | 2 | 8 | 2667 | 2780 | 3842 | 4700 |
| IX (Control) | 50 | 9 | 4 | 2 | 8 | 2575 | 2660 | 4238 | 6475 |
| XII | 360 | 85 | 25 | 14 | 12 | 2067 | 2070 | 4725 | 5413 |
| XIII | 370 | 85 | 20 | 10 | 12 | 3000 | 4170 | 5200 | 6550 |
| XIV | 365 | 75 | 10 | 10 | 12 | 3010 | 3789 | 3732 | 5400 |
| XV | 400 | 45 | 12 | 10 | 10 | 2742 | 2890 | 5175 | 6050 |
| XVI | 450 | 30 | 5 | 6 | 11 | 2861 | 3069 | 4325 | 4313 |
| XVII | 370 | 75 | 12 | 6 | 12 | 2110 | 3250 | 5000 | 5738 |
| XIX | 420 | 45 | 14 | 6 | 10 | 2438 | 2450 | 4938 | 5925 |
| XX | — | 45 | 6 | 9 | 9 | 2700 | 4400 | 4713 | 5707 |
| XXI | 300 | 50 | 10 | 3 | 9 | 1550 | 3180 | 4663 | 6313 |
| XXII | 600 | 30 | 13 | 10 | 11 | 3250 | 4430 | 4890 | 4875 |
| XXIII (Control) | 60 | 75 | 3 | 3 | 9 | 2231 | 3060 | 4613 | 4765 |
| XXVII | 400 | 35 | 7 | 6 | 10 | 2210 | 2279 | 2430 | 3030 |
| XXVIII | 400 | 35 | 15 | 6 | 9 | 3060 | 3450 | 4100 | 4970 |
| XXIX | 380 | 30 | 7 | 3 | 12 | 2767 | 2845 | 4780 | 5220 |
| XXX | 400 | 30 | 13 | 7 | 10 | 2910 | 3580 | 3845 | 5430 |
| XXXI | 390 | 30 | 12 | 7 | 10 | 3025 | 3700 | 4520 | 7020 |
| XXXII | 370 | 50 | 10 | 6 | 12 | 2520 | 3420 | 4600 | 5025 |
| XXXIII (Control) | 1000 | 23 | 6 | 1 | 10 | 3020 | 3250 | 3420 | 4390 |
| XXXV | 360 | 75 | 14 | 8 | 12 | 2960 | 3850 | 4450 | 5710 |

TABLE 2

| Example # | Skin Adhesion | | Ease of Removal | |
|---|---|---|---|---|
| | Time (secs.) | Strength | Acetone | Nail Polish Remover |
| I | 45 | S | E | E |
| II | 60 | S | E | E |
| III | 60 | W | — | — |
| IV | 60 | W | — | — |
| V | 60 | W | — | — |
| VI | 45 | S | E | E |
| VII(Control) | 1 | VS | D | D |
| VIII(Control) | 1 | VS | D | D |
| IX(Control) | 1 | VS | D | D |
| XII | 45 | S | E | E |
| XIII | 45 | S | E | E |
| XIV | 45 | S | E | E |
| XV | 30 | S | E | E |
| XVI | 45 | S | E | E |
| XVII | 45 | S | E | E |
| XIX | 30 | S | E | E |
| XX | 30 | S | E | E |
| XXI | 30 | S | E | E |
| XXII | 30 | S | E | E |
| XXIII (Control) | 1 | VS | D | D |
| XXVII | 45 | S | E | E |
| XXVIII | 30 | S | E | E |
| XXIX | 30 | S | E | E |
| XXX | 60 | S | E | E |
| XXXI | 60 | S | E | E |
| XXXII | 45 | S | E | E |
| XXXIII (Control) | 1 | VS | D | D |
| XXXV | 60 | S | E | E |

The data set forth in Tables 1 and 2 above illustrate the dramatic reduction in skin adhesion achieved by the instant compositions. All five of the control compositions formed within one second of application to skin very strong skin bonds which could damage the skin if deed our tests indicate that the proportion of cyanoacrylate should be from about 75–85% of the composition.

The instant adhesive composition of Example XXXI and the control composition of Example XXIII were also tested for the resistance to solvents and chemicals of the bonds formed. This test was conducted using stainless steel rods bonded together at their ends and allowed to cure for five days at 75° F. (24° C.) and 50% relative humidity. The tensile strength of the bond formed was then tested in the same manner as described above under "Bond Development" except that the results were averaged over five specimens rather than ten. Selected specimens were then allowed to soak for 24 hours in one of various solvents and chemicals and their tensile strength tested in the same manner. Finally, specimens which had been allowed to cure for five days were placed in boiling water for one hour, cooled for two hours at 75° F. (24° C.) and then tested. The results are given in Table 3 below, all results in this table being expressed in pounds per square inch.

(The solvent Varsol No. 1 used in these tests is a commercial mixed hydrocarbon solvent available from Exxon Company, U.S.A., of P.O. Box 2180, Houston, Tex. 77001. According to the manufacturer's, this solvent contains 18% by volume of aromatic hydrocarbons, 1.0% of olefins, 81.0% of saturated hydrocarbons, 18.0% of $C_6$ and higher aromatics and one part per million of sulfur. The solvent has a flash point of 41° C., an aniline point of 52° C. and a specific gravity of 0.797.)

TABLE 3

| Soaking Liquid Used | Example XXXI | Example XXIII (Control) |
| --- | --- | --- |
| None(5-day cure only) | 7020 | 6550 |
| Denatured alcohol | 6600 | 5750 |
| 1,1,1-Trichloroethane | 7090 | 5720 |
| Acetone | disassembled while soaking | disassembled while soaking |
| Water | 5533 | 3210 |
| Varsol No. 1 | 5410 | 6350 |
| SAE-30 Motor Oil | 5170 | 4870 |
| 1N HCl | 5990 | 4590 |
| 1N NaOH | 3410 | 1060 |
| Automatic Transmission fluid | 6110 | 5360 |
| Nail Polish Remover | disassembled while soaking | 380 |
| Toluene | 5370 | 6520 |
| n-Hexane | 5630 | 5110 |
| Boiling Water | 4580 | 2900 |

The data presented in Table 3 above show that not only does the instant composition of Example XXXI produce a bond at least as strong as the bond produced by the prior art composition of Example XXIII, but that, with the exception of the highly desirable lower resistance to nail polish remover, the bonds produced by the instant composition are at least as resistant to solvents as those produced by the prior art composition. Indeed the resistance of the instant composition to alkali and boiling water appears to be markedly better than that of the prior art composition.

ATTEMPTED REPLACEMENT OF THE VINYL CHLORIDE/VINYL ACETATE COPOLYMER IN THE INSTANT COMPOSITIONS WITH POLYVINYL ETHER, POLYVINYL CHLORIDE AND POLYVINYL ACETATE

Experiments were conducted to determine whether the vinyl chloride/vinyl acetate copolymer used in the instant compositions could be replaced with polyvinyl chloride alone, polyvinyl chloride, polyvinyl acetate or a polyvinyl ether. Firstly, pure polyvinyl methyl ether was prepared by evaporating Gantrex M-154, a 50% solution of polyvinyl methyl ether in water, to complete dryness. This polyvinyl methyl ether was then used in an attempt to prepare an adhesive composition having the following formulation:

| Reagent | % |
| --- | --- |
| Alteco E-50 | 77.45 |
| Polyvinyl methyl ether | 15.00 |
| Hydroquinone | 0.05 |
| Benzoflex S-404 | 7.50 |
| | 100.00 |

The technique used in the attempt to prepare this composition was the same as that used in Example I above. However, a homogeneous composition could not be prepared since the polyvinyl methyl ether refused to dissolve in the cyanoacrylate ester even after protracted heating to 125° C.

To test whether a pure polyvinyl acetate was usable in the instant adhesive compositions, Vinac B-15, a solid polyvinyl acetate resin manufactured by Air Products & Chemicals, Allentown, Pennsylvania, was used in an attempt to prepare a composition having the following formulation:

| Reagent | % |
| --- | --- |
| Alteco E-50 | 77.45 |
| Polyvinyl acetate | 15.00 |
| Hydroquinone | 0.05 |
| Benzoflex S-404 | 7.50 |
| | 100.00 |

Again, an attempt was made to formulate this composition using the method of Example I, but the polyvinyl acetate refused to dissolve in the cyanoacrylate ester composition even after prolonged heating at 120° C.

To determine whether polyvinyl chloride was usable in the instant adhesive compositions, VC-100RE, a commercially-available polyvinyl chloride resin manufactured by Borden, Inc., of 180 East Broad Street, Columbus, Ohio 43215, was used in an attempt to prepare a composition having the following formulation:

| Reagent | % |
| --- | --- |
| Alteco E-50 | 77.45 |
| Polyvinyl chloride | 15.00 |
| Hydroquinone | 0.05 |
| Benzoflex S-404 | 7.50 |
| | 100.00 |

Again, an attempt was made to prepare this formulation using the method of Example I above, but the polyvinyl chloride refused to dissolve in the cyanoacrylate ester even after protracted heating at 120° C.

To test whether the results obtained with a mixture of polyvinyl chloride and polyvinyl acetate differed from those with the two resins separately, an attempt was made to prepare a composition having the formulation:

| Reagent | % |
|---|---|
| Alteco E-50 | 77.45 |
| Polyvinyl acetate (Vinac B-15) | 7.50 |
| Polyvinyl chloride (VC-100 RE) | 7.50 |
| Hydroquinone | 0.05 |
| Benzoflex S-404 | 7.50 |
|  | 100.00 |

The results obtained with the mixture of polyvinyl chloride and polyvinyl acetate were no different from those obtained using the two resins separately; both resins refused to dissolve in the cyanoacrylate ester even after protracted heating at 120° C.

Finally, an attempt was made to prepare a composition identical to that in Example XXXI above except that instead of using the vinyl chloride/vinyl acetate/maleic acid terpolymer, VMCC, polyvinyl chloride, polyvinyl acetate and maleic acid were added as separate compounds. Thus, the attempted composition would have the following formulation:

| Reagent | % |
|---|---|
| RS-40X | 39.00 |
| RPNX | 38.45 |
| Polyvinyl chloride (VC-100 RE) | 12.45 |
| Polyvinyl acetate (Vinac B-15) | 2.40 |
| Maleic acid | 0.15 |
| Hydroquinone | 0.05 |
| Benzoflex S-404 | 7.50 |
|  | 100.00 |

When formulation of this composition was attempted by the method described in Example I above, the maleic acid readily dissolved in the cyanacrylate ester, but, as in the previous tests, the vinyl chloride and vinyl acetate refused to dissolve in the cyanoacrylate ester even after protracted heating at 120° C.

The above tests demonstrate that the vinyl chloride/vinyl acetate and vinyl chloride/vinyl acetate/maleic acid copolymers used in the instant adhesive compositions can not be replaced by vinyl chloride, vinyl acetate, polyvinyl ethers, mixtures of polyvinyl chloride and polyvinyl acetate or mixtures of polyvinyl chloride, polyvinyl acetate and maleic acid since these homopolymers and mixtures are not compatible with cyanoacrylate esters.

It will be apparent to those skilled in the art that various changes and modifications can be made in the preferred embodiments of the invention described above without departing from the scope of the invention. Accordingly, the foregoing description is to be construed in an illustrative and not in a limitative sense, the scope of the invention being defined solely by the appended claims.

We claim:

1. An adhesive composition comprising:
   from about 55 to about 92 percent by weight of a 2-cyanoacrylate ester;
   from about 4 to about 30 percent by weight of a vinyl chloride/vinyl acetate copolymer dissolved in said 2-cyanoacrylate ester, said copolymer having a molecular weight of at least about 8000 and containing a major proportio by weight of vinyl chloride and a minor proportion, but not less than 5% by weight, of vinyl acetate; and
   not more than about 25 percent by weight of a plasticizer.

2. A composition according to claim 1 wherein said cyanoacrylate ester comprises ethyl 2-cyanoacrylate.

3. A composition according to claim 2 wherein said ethyl 2-cyanoacrylate has a viscosity of about 5 to about 50 cPS.

4. A composition according to claim 1 wherein said cyanoacrylate ester comprises from about 75 to about 85 percent by weight of said composition.

5. A composition according to claim 1 wherein said copolymer comprises about 80 to about 90 percent by weight vinyl chloride and about 10 to about 20 percent by weight vinyl acetate.

6. A composition according to claim 1 wherein said copolymer comprises a carboxyl-modified vinyl chloride/vinyl acetate copolymer.

7. A composition according to claim 6 wherein said copolymer comprises a vinyl chloride/vinyl acetate/maleic acid terpolymer.

8. A composition according to claim 7 wherein said terpolymer comprises about 80 to about 90 percent by weight vinyl chloride, about 10 to about 20 percent by weight vinyl acetate and not more than about 2 percent by weight maleic acid.

9. A composition according to claim 1 wherein said copolymer comprises from about 10 to about 18 percent by weight of said composition.

10. A composition according to claim 1 wherein said plasticizer is selected from the group consisting of dipropylene glycol dibenzoate, diethylene glycol dibenzoate, butyl benzyl phthalate, dibutyl phthalate and benzoate esters of di- and poly-hydroxy branched aliphatic compound.

11. A composition according to claim 1 wherein said plasticizer comprises from about 3 to about 8 percent by weight of said composition.

12. A composition according to claim 1 further comprising an anionic polymerization inhibitor.

13. A composition according to claim 12 wherein said anionic polymerization inhibitor comprises sulfur dioxide.

14. A composition according to claim 1 wherein said sulfur dioxide is present in an amount of from about 0.001 to about 0.5 percent by weight of said composition.

15. A composition according to claim 1 further comprising from about 0.001 to about 0.05 percent by weight of a free radical polymerization inhibitor.

16. An adhesive composition comprising:
    from about 75 to about 85 percent by weight of ethyl 2-cyanoacrylate;
    from about 10 to about 18 percent by weight of a vinyl chloride/vinyl acetate copolymer dissolved in said 2-cyanoacrylate ester, said copolymer having a molecular weight of at least about 8000 and comprising about 80 to about 90 percent by weight vinyl chloride and about 10 to about 20 percent by weight vinyl acetate; and
    from about 3 to about 8 percent by weight of a plasticizer.

17. A composition according to claim 16 wherein said ethyl 2-cyanoacrylate has a viscosity of about 5 to about 50 cPs.

18. A composition according to claim 16 wherein said copolymer comprises a carboxyl-modified vinyl chloride/vinyl acetate copolymer.

19. An adhesive composition comprising:
   from about 75 to about 85 percent by weight of ethyl 2-cyanoacrylate;
   from about 10 to about 18 percent by weight of a vinyl chloride/vinyl acetate/maleic acid terpolymer dissolved in said 2-cyanoacrylate ester, said terpolymer having a molecular weight of at least about 8000 and comprising about 80 to about 90 percent by weight vinylchloride, from about 10 to about 20 percent by weight vinyl acetate and not more than about 2 percent by weight maleic acid; and
   from about 3 to about 8 percent by eight of a plasticizer.

20. A composition according to claim 19 wherein said ethyl 2-cyanoacrylate has a viscosity of about 5 to about 50 cPs.

21. A composition according to claim 19 wherein said terpolymer comprises about 83% by weight vinyl chloride, about 16 percent by weight vinyl acetate and about 1 percent by weight maleic acid.

22. A process for forming an adhesive composition, which comprises:
   forming a stabilized cyanoacrylate ester composition comprising a 2-cyanoacrylate ester and an anionic polymerization inhibitor; and
   dissolving a pulverulent vinyl chloride/vinyl acetate copolymer having a molecular weight of at least about 8000 in said cyanoacrylate composition at a temperature of about 70° to about 85° C. until said copolymer is completely dissolved in said cyanoacrylate composition, such that the adhesive composition formed comprises from about 55 to about 92 percent by weight of said cyanoacrylate ester and about 4 to about 30 percent by weight of said copolymer.

23. A process according to claim 22 wherein there is also dissolved in said cyanoacrylate composition a plasticizer in such an amount that said plasticizer is present in said adhesive composition in an amount of not more than about 25 percent by weight.

* * * * *

UNITED STATES PATENT OFFICE
CERTIFICATE OF CORRECTION

Patent No. 4,444,933　　　　　　　　Dated April 24, 1984

Inventor(s) Peter S. Columbus and John Anderson

It is certified that error appears in the above-identified patent and that said Letters Patent are hereby corrected as shown below:

On the title page:
In the Abstract, line 3 "40-30%" should read -- 4-30% --

Signed and Sealed this

Eleventh Day of December 1984

[SEAL]

Attest:

GERALD J. MOSSINGHOFF

Attesting Officer　　Commissioner of Patents and Trademarks

UNITED STATES PATENT AND TRADEMARK OFFICE
CERTIFICATE OF CORRECTION

PATENT NO. : 4,444,933
DATED : April 24, 1984
INVENTOR(S) : Peter S. Columbus and John Anderson It is certified that error appears in the above—identified patent and that said Letters Patent is hereby corrected as shown below:

At line 41 of Column 1, "to" should read --so--.

At line 29 of Column 3, "minutes" should read --seconds--.

At line 52 of Column 4, "are" should read --art--.

Signed and Sealed this

Sixteenth Day of April 1985

[SEAL]

Attest:

DONALD J. QUIGG

Attesting Officer

Acting Commissioner of Patents and Trademarks